US007911535B2

(12) United States Patent
Kimura

(10) Patent No.: US 7,911,535 B2

(45) Date of Patent: Mar. 22, 2011

(54) IMAGE SIGNAL PROCESSING APPARATUS AND METHOD OF CONTROLLING THE SAME

(75) Inventor: Takahiro Kimura, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/689,869

(22) Filed: Jan. 19, 2010

(65) Prior Publication Data

US 2010/0225816 A1 Sep. 9, 2010

(30) Foreign Application Priority Data

Mar. 3, 2009 (JP) ................................ 2009-049369

(51) Int. Cl.

*H04N 5/44* (2006.01)
*H04N 3/27* (2006.01)
*H04N 5/50* (2006.01)

(52) U.S. Cl. ......................... 348/554; 348/569; 348/725

(58) Field of Classification Search .................. 348/553, 348/554, 180, 725–728, 734, 569, 563, 564; 345/204; *H04N 5/44, 3/27, 5/445, 5/50, H04N 5/455, 17/00*

See application file for complete search history.

(56) References Cited

U.S. PATENT DOCUMENTS

2008/0198274 A1* 8/2008 Lee .............................. 348/734

FOREIGN PATENT DOCUMENTS

| | | |
|---|---|---|
| JP | 5-37388 | 11/1985 |
| JP | 4-051682 | 2/1992 |
| JP | 7-12744 | 3/1995 |
| JP | 09-145052 | 6/1997 |
| JP | 2005-094299 | 4/2005 |
| JP | 3850643 | 9/2006 |
| JP | 2007-060335 | 3/2007 |
| JP | 2007-081600 | 3/2007 |
| JP | 2008-294697 | 12/2008 |

* cited by examiner

*Primary Examiner* — Sherrie Hsia

(74) *Attorney, Agent, or Firm* — Blakely, Sokoloff, Taylor & Zafman LLP

(57) ABSTRACT

According to one embodiment, a memory stores demonstration image data. A set module outputs a set signal to order a demonstration. An image reading module reads the demonstration image data from the memory in response to the set signal. And a display control module controls execution of a demonstration mode which outputs the read demonstration image data for displaying, next controls execution of a display mode which outputs on-air image data for displaying at the end of the demonstration mode, and controls execution of a shift in the demonstration mode after the display mode being elapsed a predetermined time.

5 Claims, 7 Drawing Sheets

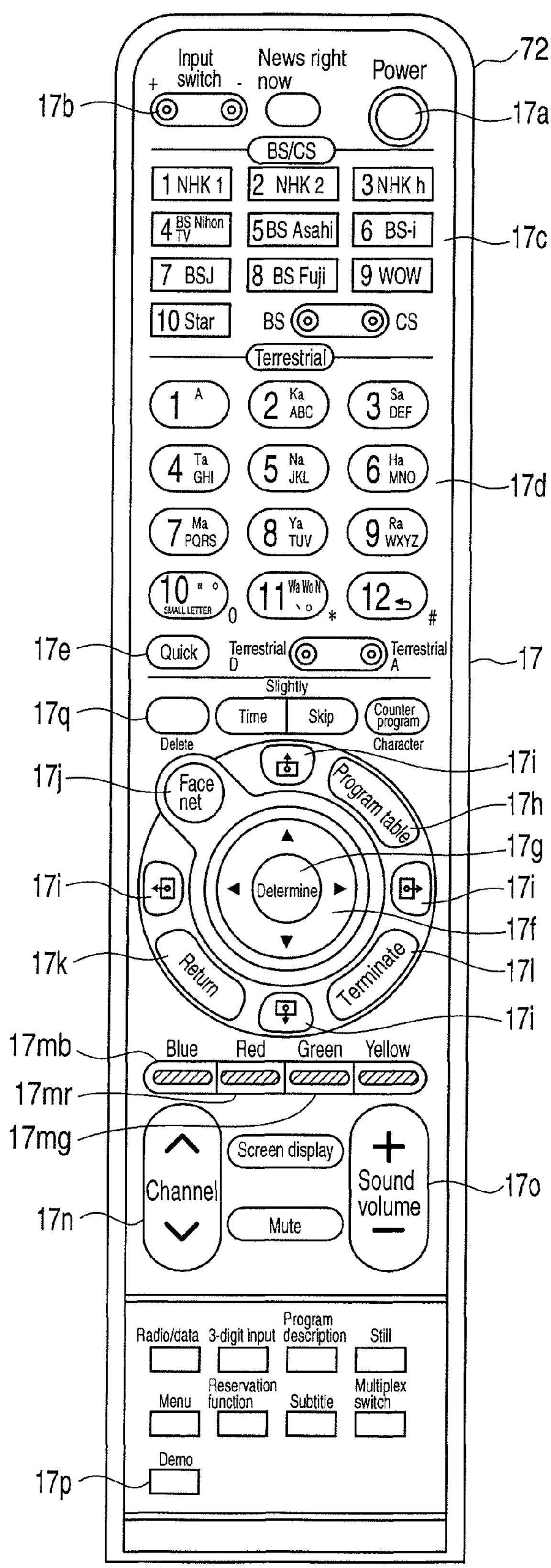
F I G. 2

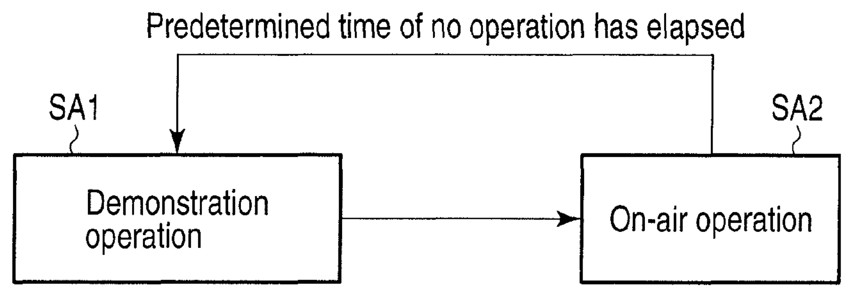
F I G. 3
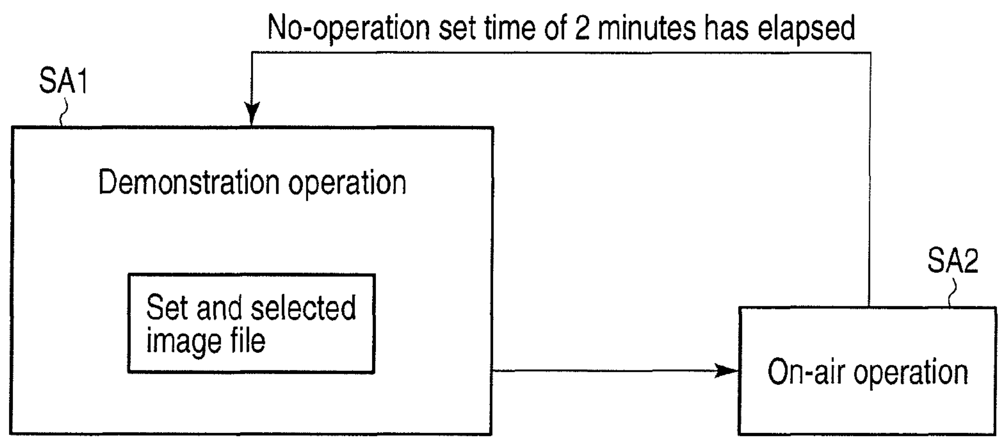
F I G. 4 A
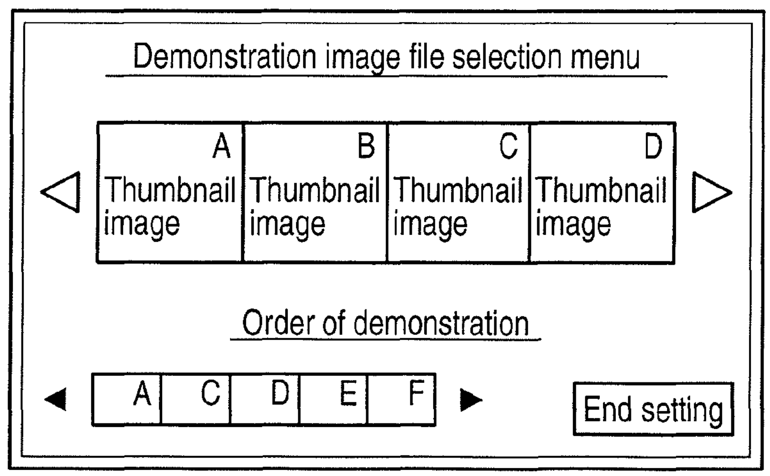
F I G. 4 B

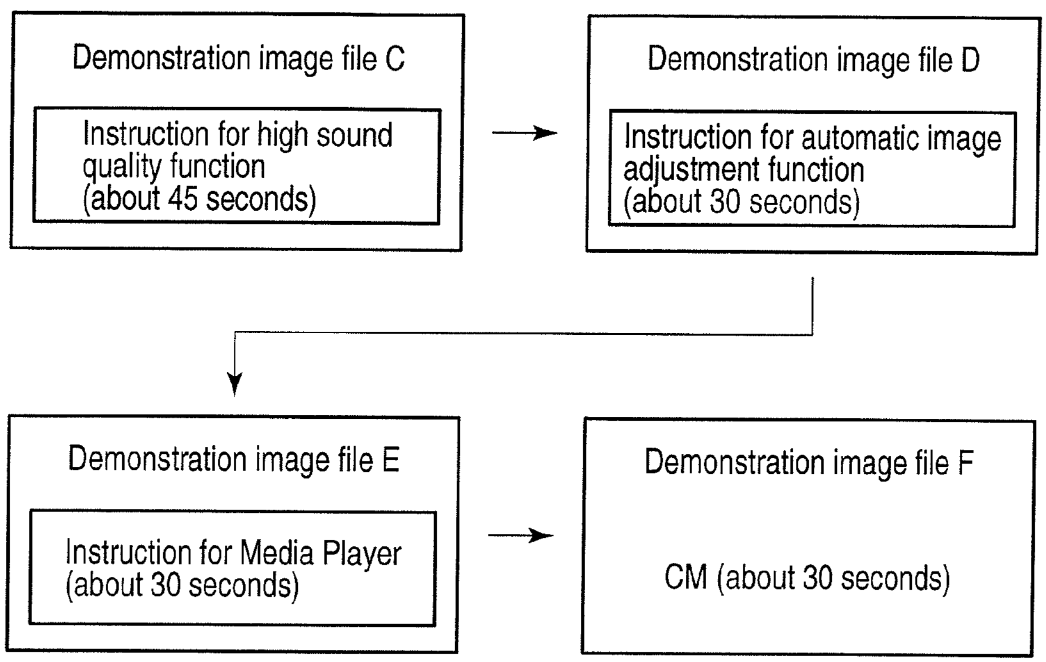
F I G. 7
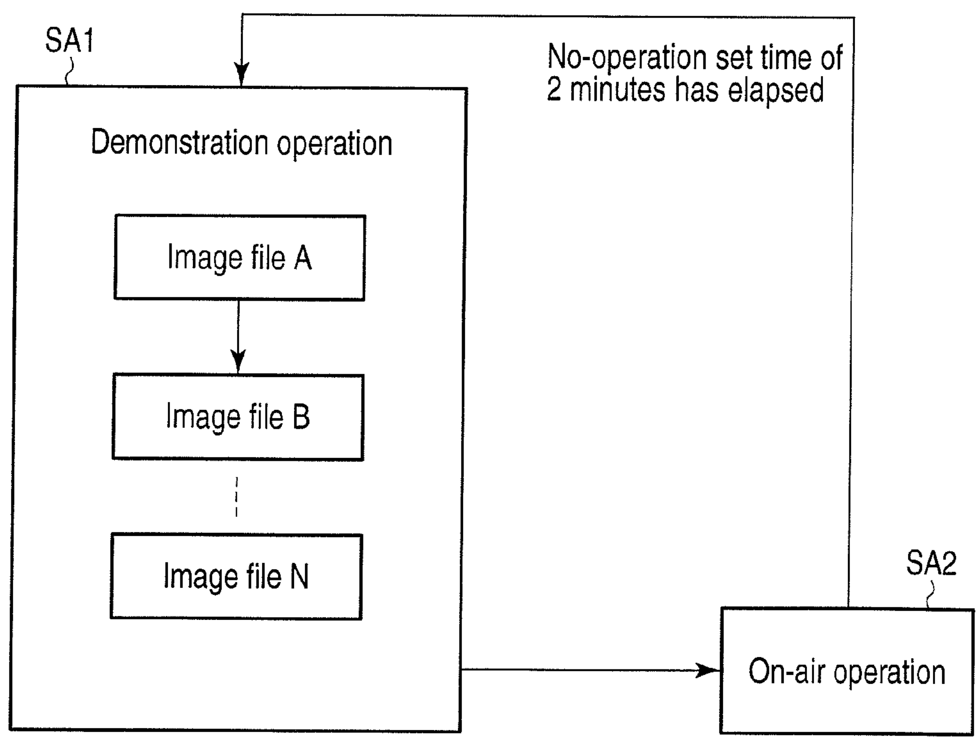
F I G. 8

| | Demo setting item | File name | Model A | Model B | Model C | Model D | Model E |
|---|---|---|---|---|---|---|---|
| Automatic demonstration (Auto Demo) | High-definition image function | Demo file 1.trp | × | × | ○ | ○ | ○ |
| | Moving image improvement function | Demo file 2.trp | | | × | × | ○ |
| | High sound quality function | Demo file 3.trp | | | × | ○ | ○ |
| | Automatic image adjustment function | Demo file 4.trp | | | × | ○ | ○ |
| | Media player | Demo file 5.trp | | | ○ | ○ | ○ |
| | CM | Demo file 6.trp | | | ○ | ○ | ○ |

F I G. 1 0

IMAGE SIGNAL PROCESSING APPARATUS AND METHOD OF CONTROLLING THE SAME

CROSS-REFERENCE TO RELATED APPLICATIONS

This application is based upon and claims the benefit of priority from Japanese Patent Application No. 2009-049369, filed Mar. 3, 2009, the entire contents of which are incorporated herein by reference.

BACKGROUND

1. Field

One embodiment of the invention relates to an image signal processing apparatus and a method of controlling the image signal processing apparatus.

2. Description of the Related Art

The present invention relates to an image signal processing apparatus and a method of controlling the image signal processing apparatus. For example, a demonstration function used when digital television broadcast receivers or recording/reproducing apparatuses are arranged in a store is devised.

When a digital television broadcast receiver is placed in a store for sale, the apparatus may be switched to a mode (hereinafter, referred to as demo mode) in which a demonstration image is displayed. For an apparatus that is switched to the demo mode, there are apparatuses described in, for example, Japanese Patent No. 3850643 and Jpn. Pat. Appln. KOKAI Publication No. 2007-81600.

The apparatus described in Japanese Patent No. 3850643 can display a mode selection screen which allows a user to select a plurality of demo modes. When a predetermined period of time has elapsed in a state in which there is no mode selection input, attention item data can be displayed.

The apparatus described in Jpn. Pat. Appln. KOKAI Publication No. 2007-81600 can conduct, for a user, a demonstration related to a function the user is interested in using. Also, the apparatus can conduct, for a distributor, a demonstration according to a situation or request.

When in a store the user checks the performance of one apparatus of his/her interest which is conducting a demonstration, he/she compares a screen of the apparatus of his/her interest with a screen of an apparatus of, for example, another manufacturer arranged next thereto. However, since the two apparatuses do not always operate with the same set function, the user may not be able to achieve a satisfactory comparison.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is an illustrative diagram showing an external appearance of a remote control in FIG. 1;

FIG. 3 is a diagram describing an operation of a characteristic module of the digital television broadcast receiver in FIG. 1;

FIGS. 4A and 4B are diagrams describing another operation of the characteristic module of the digital television broadcast receiver in FIG. 1;

FIG. 7 is a diagram describing another operation of the characteristic module of the digital television broadcast receiver in FIG. 1;

FIG. 8 is a diagram describing still another operation of the characteristic module of the digital television broadcast receiver in FIG. 1;

FIG. 10 is an illustrative diagram showing an example of data stored in a memory used for in-store demonstration.

DETAILED DESCRIPTION

Figure 1:
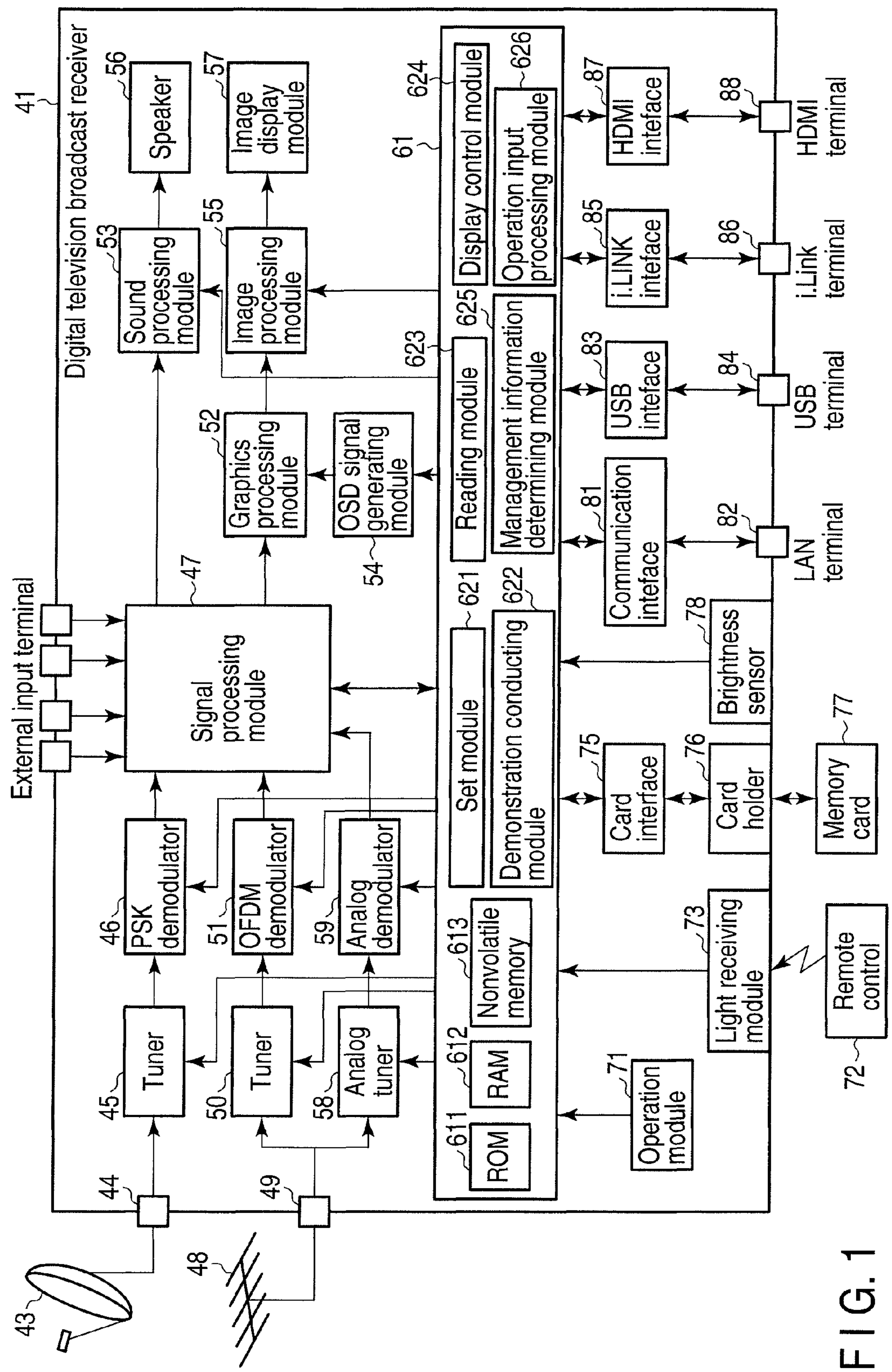
FIG. 1 is a block configuration diagram of a digital television broadcast receiver according to one embodiment of the present invention.

Various embodiments according to the invention will be described hereinafter with reference to the accompanying drawings.

According to one aspect of the present invention, an image signal processing apparatus has a set module of conducting a demonstration and can automatically repeat at least a demonstration image output and an on-air image output. Also, during a demonstration, an image file from an externally connected or built-in memory can be automatically reproduced in order to allow a user to examine the performance of the apparatus solely on the apparatus through a comparison of a plurality of images. Furthermore, the apparatus allows the user to check a function performed in the demonstration, on an on-air screen.

In another aspect of the present invention, in addition to the above, a plurality of image files for demonstration images are prepared and reproduced image content for a demonstration to feature can be selected according to a setting. Alternatively, the plurality of image files can be sequentially reproduced so that various image content can be compared and examined on a single apparatus during the demonstration.

Furthermore, in still another aspect of the present invention, the apparatus allows the user to easily understand what function of a demonstration content is featuring.

Furthermore, in yet another aspect of the present invention, a demonstration can be obtained that provides an easy comparison between the states of screens for when a function is on and off, on one same screen.

Moreover, in another aspect of the present invention, functions that can be demonstrated by an apparatus can be recognized from management information stored in an externally connected memory and the apparatus can automatically conduct demonstrations according to the setting.

According to one embodiment of the present invention, an image signal processing apparatus comprises a memory which is configured to store demonstration image data and a set module which is configured to output a set signal to order a demonstration. A reading module is configured to read the demonstration image data from the memory in response to the set signal. A display control module is configured to control output of the demonstration image data for displaying, next to control switching to a state in which on-air image data is output for displaying at the end of the demonstration, and to control execution of a shift to a demonstration operation after the state being elapsed a predetermined time.

According to the embodiment of the present invention, during a demonstration, an image file from an externally connected or built-in memory can be automatically reproduced and also an on-air image can be viewed. Thus, a user can examine the performance of an apparatus solely on the apparatus through a comparison of a plurality of images and can check image content described in a demonstration, on an on-air screen.

More specific description will be made below. First, a summary of a broadcast receiver to which the present invention is applied will be described.

FIG. 1 shows a principal signal processing system of a digital television broadcast receiver 41. Specifically, a satellite digital television broadcast signal received by an antenna 43 for receiving digital broadcasts (BS/CS) signal is supplied to a tuner 45 for satellite digital broadcasts through an input terminal 44, whereby a broadcast signal of a desired channel is selected.

The broadcast signal selected by the tuner 45 is supplied to a phase-shift keying (PSK) demodulator 46 and demodulated to a digital image signal and a digital sound signal. Then, the digital image and sound signals are output to a signal processing module 47.

A terrestrial digital television broadcast signal received by an antenna 48 for receiving terrestrial digital broadcasts is supplied to a tuner 50 for terrestrial digital broadcasts through an input terminal 49, whereby a broadcast signal of a desired channel is selected.

The broadcast signal selected by the tuner 50 is supplied to an orthogonal frequency division multiplexing (OFDM) demodulator 51 and demodulated to a digital image signal and a digital sound signal. Then, the digital image and sound signals are output to the signal processing module 47.

An analog tuner 58 which receives terrestrial analog signals is also provided. A signal received by the analog tuner 58 is demodulated by an analog demodulator 59 and the demodulated signals are output to the signal processing module 47.

The signal processing module 47 selectively performs predetermined digital signal processing on the digital image and sound signals supplied from the PSK demodulator 46, the digital image and sound signals supplied from the OFDM demodulator 51, the image and sound signals supplied from the analog demodulator 59, and further image and sound signals from line input terminals and outputs the processed signals to a graphics processing module 52 and a sound processing module 53.

Among them, the graphics processing module 52 has a function of superimposing an OSD signal generated by an on-screen display (OSD) signal generating module 54, onto the digital image signal supplied from the signal processing module 47 and outputting the superimposed signal. Also, the graphics processing module 52 can selectively output the output image signal from the signal processing module 47 and the output OSD signal from the OSD signal generating module 54 or can output the two output signals in a multiplexed manner or in combination in order to configure a half of a screen.

The digital image signal output from the graphics processing module 52 is supplied to an image processing module 55. The image processing module 55 converts the input digital image signal to an analog image signal in a format displayable on an image display module 57 and outputs the analog image signal to the image display module 57 to display an image.

The sound processing module 53 converts the input digital sound signal to an analog sound signal in a format reproducible by a speaker 56 and outputs the analog sound signal to the speaker 56 to reproduce sound.

In the digital television broadcast receiver 41, overall control of all operations including the above-described various receiving operations is performed by a control module 61.

The control module 61 includes a central processing unit (CPU), etc. When the control module 61 receives operation information from an operation module 71 or receives operation information from a remote control 72 through a light receiving module 73, the control module 61 performs overall control of each module such that the operation content is reflected in the apparatus.

In this case, the control module 61 mainly uses a read-only memory (ROM) 611 which stores a control program executed by the CPU, a random access memory (RAM) 612 which provides the CPU with a work area, and a nonvolatile memory 613 which stores various setting information, control information, etc.

The control module 61 is connected, through a card interface 75, to a card holder 76 into which a first memory card 77 can be inserted. Therefore, the control module 61 can perform transmission and reception of information with the first memory card 77 inserted into the card holder 76, through the card interface 75.

Though not shown, the control module 61 may be connected, through another card interface, to a card holder into which a second memory card can be inserted.

The control module 61 is connected to a brightness sensor 78. Therefore, the control module 61 can obtain ambient brightness information and, for example, automatically control the brightness of a screen.

The control module 61 is connected to a first LAN terminal 82 through a communication interface 81. Therefore, the control module 61 can perform transmission and reception of information with a LAN-compatible hard disk drive (HDD) connected to the first LAN terminal 82, through the communication interface 81. In this case, the control module 61 has a Dynamic Host Configuration Protocol (DHCP) server function and thus assigns an Internet Protocol (IP) address to the LAN-compatible HDD connected to the first LAN terminal 82 to control the LAN-compatible HDD. Though not shown, the control module 61 may be connected to a second LAN terminal through another communication interface.

The control module 61 is connected to a USB terminal 84 through a USB interface 83. Therefore, the control module 61 can perform transmission and reception of information with a device connected to the USB terminal 84, through the USB interface 83.

The control module 61 is connected to an i.Link (registered trademark) terminal 86 through an i.Link (registered trademark) interface 85. Therefore, the control module 61 can perform transmission and reception of information with a device connected to the i.Link (registered trademark) terminal 86, through the i.Link (registered trademark) interface 85.

The control module 61 can perform transmission and reception of information with a device connected to a High-Definition Multimedia Interface (HDMI) terminal 88, through an HDMI interface 87 which conforms to the HDMI standard.

For the memory card 77, there is, for example, a card for in-store demonstration. An in-store demonstration card can be inserted into an apparatus that conducts an in-store demonstration. Accordingly, the control module 61 comprises a set module 621, a demonstration conducting module 622, a reading module 623, and a display control module 624.

The set module 621 outputs a set signal which sets the content of a demonstration to be conducted, according to an operation. The demonstration conducting module 622 performs a demonstration operation sequence according to the set signal. The reading module 623 reads demonstration image data from a memory along with the conduct of a demonstration. The display control module 624 outputs an image of the read demonstration image data to a display module and outputs, when a demonstration mode ends, an image of on-air image data to the display module and shifts to a demonstration mode when a predetermined time of no operation has elapsed.

A management information determination module 625 and an operation input processing module 626 are also included in the control module 61. The management information determination module 625 analyzes management information about demonstrations read from a memory to determine whether there are demonstration files adapted to the specifications of the apparatus. The operation input processing module 626 is a processing module which determines an operation input from the remote control 72 to set a function of the apparatus. Note that demonstration information (demonstration image data, demonstration management information, etc.) may be stored in a built-in memory of the apparatus.

FIG. 2 shows an external appearance of the remote control 72. The remote control 72 is mainly provided with a power key 17*a*, an input switching key 17*b*, direct tuning keys 17*c* for satellite digital broadcast channels, direct tuning keys 17*d* for terrestrial broadcast channels, a quick key 17*e*, a cursor key 17*f*, a determination key 17*g*, a program table key 17*h*, page switching keys 17*i*, a face net (navigation) key 17*j*, a return key 17*k*, a terminate key 17*l*, color keys in blue, red, and green 17*mb*, 17*mr*, and 17*mg*, a channel up and down key 17*n*, a sound volume adjustment key 17*o*, etc.

When the program table key 17*h* is pressed, a program table is displayed. When the terminate key 17*l* is pressed, the apparatus returns to an on-air (display of an image of a channel currently received) state.

FIG. 3 is a diagram describing characteristic operations of the above-described digital television broadcast receiver. According to the apparatus, when a card for in-store demonstration is used as the memory card 77 and the apparatus is turned on and a demo key 17*p*, for example, on the remote control 72 is pressed, the apparatus can shift to a demonstration operation. In the demonstration operation, for example, image data of a preset image file is reproduced. Alternatively, instructions for the functions of the apparatus, etc., may be executed. For demonstration contents, various embodiments can be used.

In the apparatus in the present invention, when the demo key 17*p*, for example, on the remote control 72 is pressed, the set module 621 outputs a set signal to order a demonstration. In response to the set signal, the reading module 623 reads demonstration image data from the memory. Then, the display control module 624 outputs an image of the read demonstration image data to the image display module 57.

The display control module 624 executes a demonstration mode which outputs the read demonstration image data to the image display module 57 and shifts, when the demonstration mode ends, to a display mode which outputs on-air image data to the image display module 57 and shifts to the demonstration mode when a predetermined time of no operation in the display mode has elapsed. The basic operations of the display control module 624 are shown in FIG. 3.

When such operations are performed, during a demonstration, an image file from an externally connected or built-in memory can be automatically reproduced and an on-air image can be viewed. Thus, a user can examine the performance of the apparatus solely on the apparatus through a comparison of a plurality of images and can check image content described in a demonstration, on an on-air screen reflected the demonstration setting.

Note that the above describes that the apparatus shifts to a demonstration operation when no operation is performed for a predetermined time in an on-air operation state; however, the predetermined time can be arbitrarily changed. This change may be made such that, for example, an item such as "shift time from on-air to demonstration: XX minutes" is provided on a menu screen so that the time can be set with the item.

When a type of demonstration is selected, for example, a demonstration function item is selected on a demonstration menu. Function items include, for example, a high-definition image function, a moving image improvement function, a high sound quality function, an automatic image adjustment function, Media Player, and screening of an advertising video.

The present invention is not limited to the above-described embodiment. As shown in FIG. 4A, the configuration may be such that a plurality of image files for demonstration images are prepared so that during a demonstration operation a reproduced image for a demonstration to feature can be selected. FIG. 4B shows a state of a selection screen displayed on the image display module 57 when images to be used for demonstrations are selected from a plurality of demonstration image files stored in the memory card 77. For example, when the "demo image setting" item is selected on a menu screen and a determination button is pressed, a screen such as that shown in FIG. 4B appears. At the top of the screen, representative images of a plurality of image files for demonstration images are arranged in thumbnail form. Here, the user selects thumbnail images of desired files for use in demonstration by a cursor and presses a determination button. By doing so, as shown at the bottom of the screen, image file names A, C, D . . . are arranged in order of selection. In this case, the number of files to be selected may be one.

After the setting, when the user operates a return button and presses the demo key 17*p*, the apparatus shifts to a demonstration operation.

Figure 5:
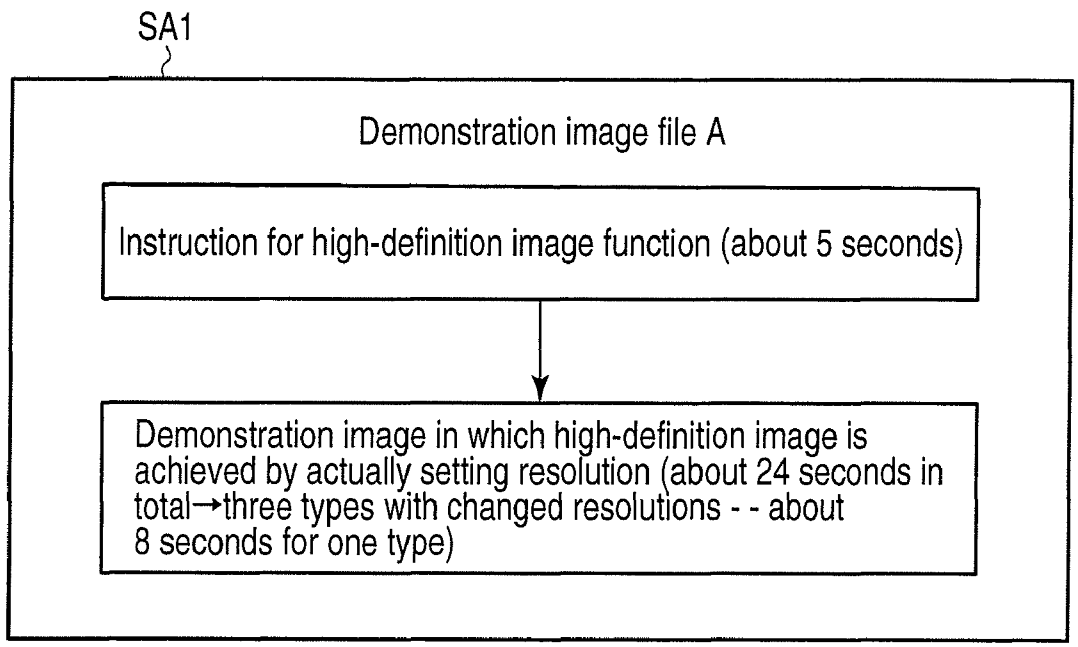
FIG. 5 is a diagram describing still another operation of the characteristic module of the digital television broadcast receiver in FIG. 1.

An exemplary demonstration operation in FIG. 5 shows an example in which a high-definition image function demonstration is selected. This demonstration is for the high-definition image function. When a demonstration operation starts, an instruction for the high-definition image function is provided for about 5 seconds, for example, and then a demonstration image (either a moving image or still image) is actually provided for 24 seconds. In the demonstration, for example, the high-definition image function is switched between on and off every 2 seconds and image output for about 8 seconds is performed for one type. Accordingly, the user can examine the effect of the high-definition image function through a comparison.

Figure 6:
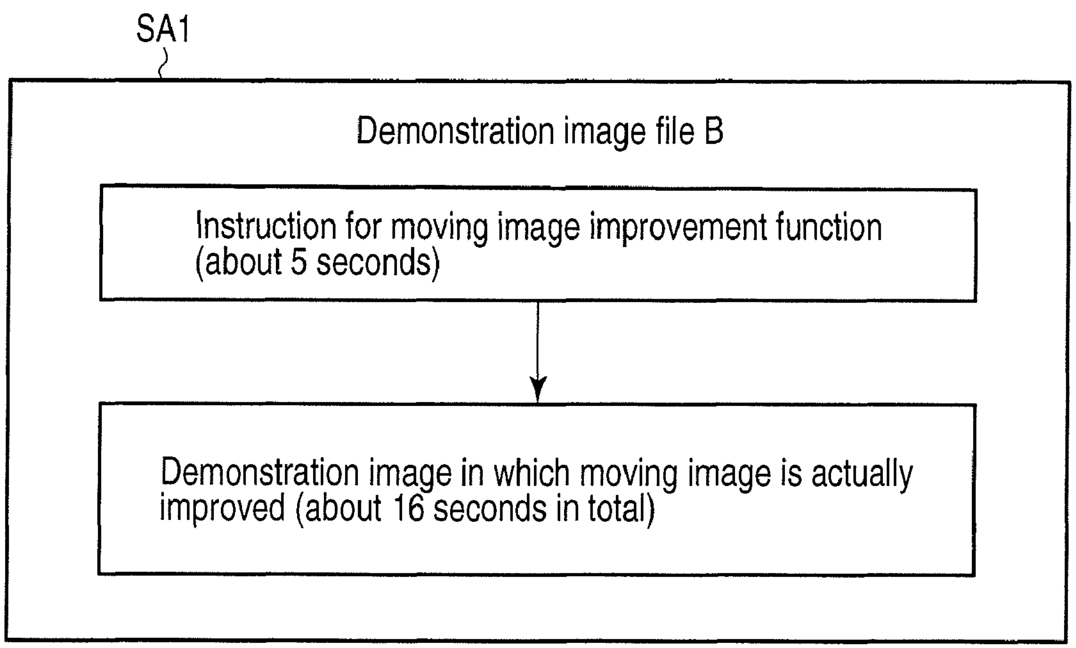
FIG. 6 is a diagram describing yet another operation of the characteristic module of the digital television broadcast receiver in FIG. 1.

An exemplary demonstration operation in FIG. 6 shows an example in which a moving image improvement function demonstration is selected. This demonstration relates to the moving image improvement function. When a demonstration operation starts, for example, an instruction for the moving image improvement function is provided for about 5 seconds and the actual moving image improvement function is performed (about 16 seconds). At this time, for example, full screen on → full screen off → full screen on . . . of the moving image improvement function are repeated every 2 seconds. Accordingly, the user can recognize the effect of Active Vision M200.

A demonstration operation shown in FIG. 7 shows the case of a setting in which a plurality of image files can be sequentially reproduced. In this example, a selective setting is performed to sequentially reproduce demonstration image files C, D, E, and F. The demonstration image file C is a file which provides an instruction for the high sound quality function which is a function of the apparatus for about 45 seconds, together with a moving image. The demonstration image file D is a file which provides an instruction for the automatic image adjustment function which is a function of the apparatus for about 30 seconds, together with various still images, for example. The demonstration image file E is a file which provides an instruction for the Media Player which is a function of the apparatus for about 30 seconds, together with a moving image, for example. The demonstration image file F is a file which provides a commercial image for about 30 seconds, together with a moving image.

FIG. 8 shows a state in which numbers of moving image files are sequentially reproduced during a demonstration operation. When the last image file is reproduced, the apparatus basically shifts to an on-air operation. When there is no operation for 2 minutes during the on-air operation, the apparatus shifts to a demonstration operation.

Figure 9:
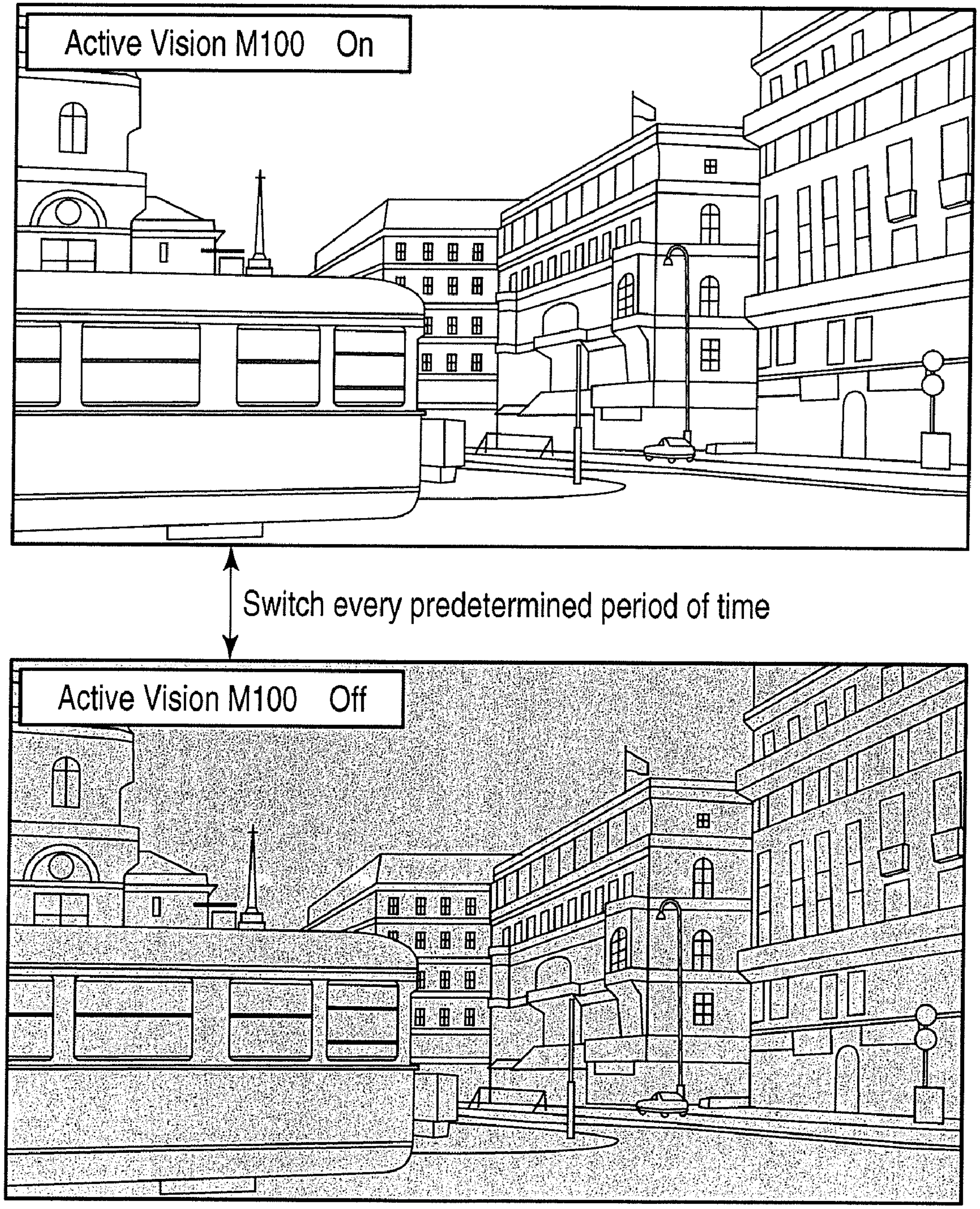
FIG. 9 is an illustrative diagram showing an example for when images are compared in a demonstration mode.

FIG. 9 shows a state in which, when the actual moving image improvement or high image quality improvement function is performed (about 16 seconds), for example, full screen on → full screen off → full screen on . . . of the moving image improvement or high image quality improvement function are repeated every 2 seconds (not necessarily 2 seconds). By this, the user can visually sense a change in the brightness of the screen and thus can recognize the effect of Active Vision M100.

The present invention is not limited to the above-described embodiment. For example, a memory card for in-store demonstration may store a management information table such as that shown in FIG. 10.

Specifically, the management information table includes the type names of a plurality of demonstrations, a plurality of model names, and conduct enable/unable information which identifies whether the models can conduct the demonstrations. The set module 621 determines a set signal to order a demonstration by referring to the management information table.

For the types of demonstrations, there are a demonstration related to resolution and demonstrations related to the previously described Active Vision M200 (which may be called ClearScan 240) and Active Vision M100 (which may be called ClearFrame). Furthermore, there are demonstrations related to Dolby Volume, AutoView, Media Player, and screening of an advertising video. File names are set to respective files storing the respective demonstration data.

Flags are described which indicate which model of digital television broadcast receiver can support which demonstration. Various digital television broadcast receivers are classified by model name. Here, model A, model B, model C, model D, and model E are shown as an example.

The flags indicate that models A and B do not have any of demonstration functions. The flags indicate that model E has all the demonstration functions, i.e., demonstration functions related to the high-definition image function, the moving image improvement function, the high sound quality function, the automatic image adjustment function, the Media Player, and the screening of the advertising video. The flags indicate that model D does not have a demonstration function related to the moving image improvement function. The flags indicate that model C does not have demonstration functions related to the moving image improvement function, the high sound quality function, and the automatic image adjustment function.

When, as described above, management information is stored in a memory card for in-store demonstration, for data stored in the memory card unified data can be generated and stored. That is, different data to be stored in a memory card do not need to be generated for different models.

On the other hand, a digital television broadcast receiver reads and analyzes the management information, recognizes file names of files for demonstrations that can be supported by the apparatus, and specifies the files, whereby the files can be read and decompressed into a RAM and the demonstrations can be performed.

As described above, the present invention is applied to image signal processing apparatuses and digital television broadcast receivers. Also, the present invention is useful for application to recording/reproducing apparatuses, set-top boxes, etc.

While certain embodiments of the invention have been described, these embodiments have been presented by way of example only, and are not intended to limit the scope of the invention. Indeed, the novel methods and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. An image signal processing apparatus comprising:
- a memory configured to store image data for a demonstration to describe functions of the apparatus;
- a set module configured to output a set signal to order reproduction of the image data;
- an image reader configured to read the image data from the memory in response to the set signal; and
- a display controller configured to output the read image data for displaying to execute a demonstration mode, shift the demonstration mode to a display mode in which on-air image data is output for displaying when the demonstration mode ends, and shift the display mode to the demonstration mode after no operation is performed for a predetermined period of time,
- wherein the display controller further includes a means for outputting an instruction to perform a function of demonstration in the demonstration mode, and a means for alternately outputting, on one screen, an on-state screen of a function to set image quality and an off-state screen of the function to set image quality.

2. The image signal processing apparatus of claim 1, wherein
- a plurality of image files to be used in the demonstration mode are prepared in the memory, and
- the set module performs a setting to select a preferable image file to be used in the demonstration mode from among said plurality of image files or to sequentially reproduce said plurality of image files.

3. The image signal processing apparatus of claim 1, wherein
- the memory stores a management information table including type names of a plurality of demonstrations, names of a plurality of models, and conduct enable/unable information which identifies whether models can conduct the demonstrations, and
- the set module determines the set signal to order a demonstration by referring to the management information table.

4. The image signal processing apparatus of claim 1, further comprising:

a receiving module configured to receive a television broadcast signal;

a demodulating and signal processing module configured to demodulate and process a signal received from the receiving module, and convert the signal to an image signal;

an image display module configured to be supplied with image data from the demodulating and signal processing module and the image data for the demonstration from the image reader; and a holder into which the memory is allowed to be inserted.

5. A method of controlling an image signal processing apparatus which reads image data for a demonstration to describe a function of the apparatus from a memory and conducts a demonstration, the method comprising:

generating a set signal to order reproduction of the image data;

reading the image data from the memory in response to the set signal;

outputting the read image data for displaying to execute a demonstration mode, shifting the demonstration mode to a display mode in which on-air image data is output for displaying when the demonstration mode ends, and shifting the display mode to the demonstration mode after no operation is performed for a predetermined period of time, wherein further comprised by performing a setting to output an instruction to perform a function of demonstration in the demonstration mode, and alternately output, on one screen, an on-state screen of a function to set image quality and an off-state screen of the function to set image quality.

* * * * *